(12) United States Patent
Sim

(10) Patent No.: US 7,709,571 B2
(45) Date of Patent: May 4, 2010

(54) MULTICOMPONENT LUBRICANT COMPOSITION FOR PROCESSING RIGID VINYL CHLORIDE POLYMERS

(75) Inventor: Francis Sim, Allentown, PA (US)

(73) Assignee: Honeywell International Inc, Morristown, NJ (US)

( * ) Notice: Subject to any disclaimer, the term of this patent is extended or adjusted under 35 U.S.C. 154(b) by 346 days.

(21) Appl. No.: 11/589,486

(22) Filed: Oct. 30, 2006

(65) Prior Publication Data

US 2008/0099730 A1    May 1, 2008

(51) Int. Cl.
*C08G 18/65* (2006.01)
*C08J 3/22* (2006.01)

(52) U.S. Cl. .......................... 524/491; 524/57; 524/487; 524/275; 524/385; 524/502; 524/569; 524/474; 524/477; 508/534; 106/10; 252/400.21

(58) Field of Classification Search ............ 252/400.21; 524/57, 487, 275, 385, 491, 502, 569, 474, 524/477; 508/534; 106/10
See application file for complete search history.

(56) References Cited

U.S. PATENT DOCUMENTS

| | | | | |
|---|---|---|---|---|
| 3,883,362 A | 5/1975 | Yates et al. | ................. | 106/268 |
| 4,030,328 A | 6/1977 | Wagner et al. | ................. | 72/45 |
| 4,072,790 A * | 2/1978 | Creekmore et al. | ......... | 428/220 |
| 4,132,691 A * | 1/1979 | Ejk | ............................. | 524/178 |
| 4,248,747 A * | 2/1981 | Washecheck et al. | ....... | 524/275 |
| 4,544,694 A | 10/1985 | Bower | ......................... | 524/385 |
| 4,661,163 A | 4/1987 | Berke et al. | .................. | 106/270 |
| 4,873,005 A * | 10/1989 | Hyde | .......................... | 508/319 |
| 4,975,120 A * | 12/1990 | Hyche et al. | ................. | 106/271 |
| 5,134,185 A * | 7/1992 | Lindner | ....................... | 524/313 |
| 5,728,754 A | 3/1998 | Lakshmanan et al. | ........ | 523/173 |
| 5,750,608 A * | 5/1998 | Lindner et al. | .............. | 524/399 |
| 6,069,195 A * | 5/2000 | Lindner | ....................... | 524/313 |
| 6,169,148 B1 * | 1/2001 | Deckers et al. | ............ | 525/333.8 |
| 6,231,656 B1 * | 5/2001 | Dekerf et al. | ............. | 106/38.25 |
| 2004/0259984 A1 | 12/2004 | Gibson | | |
| 2006/0094802 A1 * | 5/2006 | Gibson et al. | ................. | 524/35 |
| 2006/0107866 A1 * | 5/2006 | Yang et al. | .................... | 106/10 |
| 2008/0021135 A1 * | 1/2008 | Garft et al. | .................... | 524/13 |

FOREIGN PATENT DOCUMENTS

| | | |
|---|---|---|
| EP | 0277831 | 8/1988 |
| EP | 1086988 | 3/2001 |
| WO | WO 2005/090469 A1 * | 9/2005 |
| WO | WO2005090469 | 9/2005 |

* cited by examiner

*Primary Examiner*—Mark Eashoo
*Assistant Examiner*—Jane L Stanley
(74) *Attorney, Agent, or Firm*—Carrie Boaths

(57) ABSTRACT

Lubricant compositions and processes for producing such lubricant compositions. More specifically, low viscosity lubricant compositions for the working surface of an extrusion die during the processing of plastics that require lubricants to render them processable, such as polyvinyl chloride, chlorinated polyvinyl chloride, polyvinylidene chloride and copolymers thereof. The lubricant composition may include up to about 70% by weight of at least one metal salt while maintaining a melt viscosity low enough to process on conventional finishing equipment such as prill towers or pastillating equipment.

22 Claims, No Drawings

MULTICOMPONENT LUBRICANT COMPOSITION FOR PROCESSING RIGID VINYL CHLORIDE POLYMERS

BACKGROUND OF THE INVENTION

1. Field of the Invention

The present invention relates to lubricant compositions and to processes for producing such lubricant compositions. More specifically, the invention pertains to low viscosity lubricant compositions for the working surface of an extrusion die. The lubricants are particularly useful in the processing of plastics that require lubricants to render them processable, such as polyvinyl chloride (PVC), chlorinated polyvinyl chloride (CPVC), polyvinylidene chloride (PVDC) and copolymers thereof.

2. Description of the Related Art

For many years, plastics such as polyvinyl chloride (PVC), chlorinated polyvinyl chloride (CPVC) and polyvinylidene chloride (PVDC) have been widely employed for various uses, including the fabrication of tubing and rigid pressurized piping. Of these materials, polyvinyl chloride is particularly desirable for forming rigid tubing and piping articles because of its low cost and beneficial properties, such as exceptional corrosion resistance to acids, corrosive liquids and gases. PVC tubing also exhibits smooth interior walls for unimpeded flow and reduced sediment buildup. It is non-contaminating, provides fast and reliable solvent-welded connections, offers good pressure-bearing capability, and provides ease of handling and installation. Although PVC is a very versatile polymer exhibiting such desirable properties, PVC base resin is also relatively hard and brittle and is very difficult to process with manufacturing equipment such as extruders, injection molders or other equipment used to process PVC compounds, such as prillers, flakers and pastillators. Accordingly, proper compounding and good lubricant balance are very important in obtaining good machine and end product properties.

It has been known in the art to use lubricant systems as extrusion aids to facilitate the processing of plastics such as PVC, CPVC and PVDC. Lubricants are materials that control the melting point in an extruder/molder to achieve the best processing characteristics and physical properties. Such lubricants may be external, internal or external/internal. External lubricants provide good release from metal surfaces and lubricate between the individual PVC particles and the metal surface. They are normally non-polar molecules, such as alkanes, and are usually paraffin waxes, mineral oils or polyethylene. External lubricants are normally incompatible with PVC, delay fusion and help the PVC slip over the hot melt surfaces of dies, barrels and screws without sticking and contribute to the gloss on the end product surface. They eventually migrate to the melt surface of the PVC, providing lubrication between the polymer and the metal surfaces of the extrusion equipment and are used primarily for processing of rigid PVC in applications where clarity is not a critical factor. External lubricants are prevailingly waxes, with the most conventional being paraffin waxes. Paraffin waxes are waxes that are separated from crude oil during the production of light lubricating oils. They are clear, odor free and can be refined for food contact.

Internal lubricants provide lubrication at the molecular level between resin particles and reduce the melt viscosity by improving inter-particulate flow when the PVC or other thermoplastic is in molten form. They are normally polar molecules, are usually fatty acids, fatty acid esters or metal esters of fatty acids and are very compatible with PVC. They lower melt viscosity, reduce internal friction and promote fusion. External/internal lubricants provide both external and internal lubrication depending on the combination of chemical groups contained. These have chemical groups of both lubricant types and generally have long hydrocarbon chains, along with amide, alcohol, acids and ester groups. Common types used in PVC are fatty acid amides and oxidized polyethylenes. Some of these materials will lubricate as an external lubricant before melting and as internal lubricants after melting. Others will do the reverse. Each of these lubricants should be characterized for its type of lubrication in a given PVC compound.

The purpose of lubrication is to achieve the full properties of a plastic and a melt that will extrude or mold without problems, at an economical cost. It has been found that highly effective lubricant compositions generally consist of a combination of at least one wax component, such as hydrocarbon waxes, alpha-olefin waxes and polyethylene waxes, and at least one fatty acid component or at least one metal salt of a fatty acid. However, it has also been found that known lubricant compositions blending waxes and such fatty acids or metal salts of fatty acids, undesirably increase the viscosity of the lubricant composition, rendering the lubricant difficult to process and finish on manufacturing equipment. Accordingly, a lower viscosity alternative is desired.

The present invention provides a solution to this need in the art. It has been unexpectedly found that the incorporation of an oxidized, low viscosity byproduct wax component reduces melt viscosity, allowing higher levels of a metal stearate to be incorporated, thereby producing an improved low viscosity lubricant composition. Particularly, the invention provides a multi-component lubricant composition comprising at least one oxidized, low viscosity wax and at least one metal salt, which metal salt comprises at least about 30% by weight of the lubricant composition. In the related art, U.S. Pat. No. 4,544,694, teaches a lubricant composition that is different than the present invention. In particular, their lubricant composition fails to include the oxidized, low viscosity byproduct wax component of the invention and they fail to teach a lubricant composition having the low viscosities taught herein.

The oxidized, low viscosity byproduct wax has a melt viscosity of less than or equal to about 100 centipoise at 140° C., an acid number of from about 7 to about 24 mg KOH/gram. Together with the metal salt component, the lubricant composition has a viscosity of less than about 450 cps at 140° C. Byproduct waxes from the polymerization of high density polyethylene are known, for example, from U.S. Pat. No. 5,728,754, which is incorporated herein by reference.

Incorporation of the oxidized, low viscosity wax into the blend permits levels of metal salt of about 70% or more while maintaining a melt viscosity low enough to process on conventional finishing equipment. Particularly, the lubricant composition can be used to provide internal and external lubrication when processing PVC compounds. Internally, it provides good melt blending and low processing temperatures, i.e. reduced shear heat, and externally it prevents the PVC compound from sticking to the metal surfaces of the processing equipment such as extruders, injection molders, prill towers, pastillating equipment, or other equipment used to process PVC compounds.

SUMMARY OF THE INVENTION

The invention provides a lubricant composition comprising:

a) an oxidized, low viscosity wax having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5; and said wax comprising a substantially linear polymer; and b) at least one metal salt, which metal salt comprises a reaction product of the reaction of a metal oxide or a metal hydroxide with a fatty acid, and which metal salt comprises at least about 30% by weight of the lubricant composition; and wherein said lubricant composition has a viscosity of less than about 450 cps at 140° C.

The invention also provides a process for forming a lubricant composition comprising:

a) providing a wax melt comprising at least one oxidized, low viscosity wax, said oxidized, low viscosity wax having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5; and said wax comprising a substantially linear polymer; and thereafter performing either b) or c);

b) blending at least one metal salt into said wax melt, which metal salt comprises a reaction product of the reaction of a metal oxide or a metal hydroxide with a fatty acid, and which metal salt comprises at least about 30% by weight of the lubricant composition; or c) reacting a fatty acid with either a metal oxide or a metal hydroxide in said wax melt, under conditions sufficient to form a metal salt reaction product.

The invention further provides a lubricant composition comprising:

a) from about 10% to about 35% by weight of the composition of at least one oxidized, low viscosity wax, having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5; said wax comprising a substantially linear polymer; and wherein said oxidized, low viscosity wax comprises a byproduct composition produced by the polymerization of polyethylene with a Ziegler-type catalyst;

b) from about 5% to about 20% by weight of at least one hydrocarbon wax;

c) from about 1% to about 10% by weight of at least one fatty acid;

d) from about 5% to about 15% by weight of a fatty alcohol or fatty acid ester; and e) at least one metal salt, which metal salt comprises a product of the reaction of a metal oxide or a metal hydroxide with said fatty acid, and which metal salt comprises at least about 30% by weight of the lubricant composition; and wherein said lubricant composition has a viscosity of less than about 450 cps at 140° C.

DETAILED DESCRIPTION OF THE PREFERRED EMBODIMENTS

The multi-component lubricant composition of the invention is formed from raw materials including at least one oxidized, low viscosity wax, at least one metal salt and optionally a hydrocarbon wax. As described herein, an oxidized, low viscosity wax is a substantially linear polymer wax having a melt viscosity of less than or equal to about 100 centipoise at 140° C., an acid number of from about 7 mg KOH/gram to about 24 mg KOH/gram, a weight average molecular weight of less than about 1500, a number average molecular weight of less than about 800, and a polydispersity index of at least about 3.5. More preferably, the oxidized, low viscosity wax has a viscosity of less than about 75 cps at 140° C., most preferably less than about 50 cps at 140° C. The viscosity values herein are measured using a Brookfield rotational viscometer using techniques that are well known in the art. Acid numbers, with units of mg KOH/gram, are determined by standardized titration of KOH using techniques that are well known in the art.

Particularly, a low viscosity wax of the invention preferably comprises a byproduct composition recovered during the polymerization of ethylene with a Ziegler-type catalyst, such as a Ziegler-Natta catalyst, via a process conventionally known in the art as the Ziegler slurry polymerization process. In general, the Ziegler slurry polymerization process is used to form high density polyethylene (HDPE) homopolymers or ethylene copolymers, such as ethylene-α-olefin copolymers. A Ziegler-type catalyst is formed by the interaction of the alkyls of Group I-III metals with halides and other derivatives of transition metals in Groups IV-VIII of the Periodic Table of Elements. In a typical catalyst preparation process, the catalyst is prepared from titanium tetrachloride and aluminum trimethyl or a related material. The catalyst may also be impregnated on a support to yield higher efficiency in terms of rate of product per unit of the catalyst. As is well known in the art, suitable catalyst supports are typically inorganic compounds, and is most commonly magnesium chloride. Other suitable supports non-exclusively include those described in, for example, U.S. Pat. Nos. 4,069,169 and 5,409,875, which are incorporated herein by reference. While unsupported Ziegler-Natta catalysts may be used for polymerizations of this type, supported catalysts are generally preferred for polyolefin production because they exhibit much higher activities than non-supported catalysts. In addition to the actual catalyst, a co-catalyst is preferably used. The co-catalyst may generally be any organometallic aluminum-alkyl compound, and preferably comprises triethylaluminum. The function of the co-catalyst is primarily to scavenge impurities in the system, which may terminate polymerization. Typically, the catalyst/co-catalyst pair are $TiCl_3$ and $Al(C_2H_5)_2Cl$, or $TiCl_4$ and $Al(C_2H_5)_3$. The Ziegler-Natta catalyst, in particular, is synthesized by treating crystalline α-$TiCl_3$ with $[AlCl(C_2H_5)_2]_2$, whereby polymerization occurs at special Ti centers located on the exterior of the crystallites.

In a typical Ziegler slurry process, ethylene is fed under low pressure into a reactor which contains liquid hydrocarbon to act as a diluent (i.e. solvent). The diluent is typically a heavy diluent, such as hexane or heptane or a hexane-heptane mixture. The catalyst may be fully prepared and fed into the vessel, continuously or batchwise, or may be prepared in situ by feeding the components directly into the main reactor. The reaction is carried out at some temperatures below 100° C., typically at 70° C., in the absence of oxygen, water, carbon dioxide and the like, all of which reduce the effectiveness of the catalyst. The catalyst remains suspended and the HDPE polymer, as it is formed, becomes precipitated from the solution and a slurry is formed which progressively thickens as the reaction proceeds. Some catalyst remains in the HDPE product. Most of the catalyst residue remains in the byproduct wax polymer/diluent portion.

During polymerization, low molecular weight, wax-like fractions are solubilized in the diluent that is used during polymerization. The diluent acts both as a solvent for the ethylene monomer and as a dispersing agent for the catalyst. The HDPE product of the Ziegler polymerization process is insoluble in the diluent and precipitates, but the byproduct wax produced remains dissolved in the diluent. The recovery of byproduct waxes are generally confined to processes that utilize Ziegler catalysts in heavy diluents, most commonly hexane. Polymerization processes that use light diluents, such as i-butane or propane, do not generate byproduct waxes that can be isolated.

The byproduct wax is a high density polyethylene wax, preferably a polyethylene homopolymer wax that has a density of from about 0.92-0.96 g/cc. The byproduct wax is distinguished from other polyethylene waxes made by direct synthesis from ethylene or made by thermal degradation of high molecular weight polyethylene resins, each of which form polymers of both high and low densities. The byproduct waxes are also generally not recovered from manufacturing processes using light diluents, nor from other processes such as gas phase polymerization processes or solution polymerization processes.

After completing the Ziegler polymerization of the ethylene, the crude, low viscosity, byproduct wax of the invention is collected. The primary high molecular weight HDPE product is separated by centrifuging from the diluent (e.g. hexane), spent catalyst residue and low molecular weight wax, and the diluent is sent to a diluent recovery unit. Most of the diluent is flashed in the recovery unit for recovery and recycling. The remaining bottoms typically contains the byproduct wax, catalyst residue, and possibly residual support compound and small quantities of diluent. Preferably, this mixture is filtered to remove gross contaminants and some, but not all, of the catalyst residue. It is then heated to remove the last traces of remaining diluent (hexane). The crude wax is then filtered using a fine filtration step. This removes 98% of the catalyst residue leaving a wax that still contains oily contaminants and greases, such as oligomers. These interfere with most applications and must be removed in a refining step. They can also be hazardous in that they impart a low flashpoint to the wax.

Refining can be done in a batch type process or in a continuously operating process. There are multiple techniques to further purify the crude byproduct wax, including but not limited to gas stripping, heating or vacuum stripping to remove any residual diluent, holding the melted wax in an unagitated vessel to settle the catalyst and support and decanting off the clarified wax, and filtration of the molten wax through suitable filtration media to remove the catalyst and support. Such techniques are well known in the art. Full refining of the crude wax may be conducted, and may include purification by thin film evaporation. In a preferred refining method, the byproduct wax is heated and subjected to a vacuum at elevated temperatures to strip out the offending oils. The refining equipment used can vary widely from a simple stirred batch tank to a thin film evaporator. Following the refining, an additional filtration may be conducted if needed. At this point the byproduct wax is free of catalyst residues and offending oils and has undergone considerable property improvements, such as an increased melting point, the molecular weight is narrowed, increased crystallinity due to the removal of oily contaminants, and greater performance consistency.

The byproduct wax is subsequently oxidized. In the preferred embodiments of the invention, the oxidized, low viscosity byproduct wax has an acid number of from about 7 to about 24 mg KOH/gram, more preferably from about 7 to about 18 mg KOH/gram. The oxidation process is preferably conducted in a stirred tank reactor at an oxidation rate of from about 1.6 acid units/hour to about 3.5 acid units/hour, more preferably at an oxidation rate of about 2.0 acid units/hour to about 2.7 acid units/hour. Air or oxygen containing gases are sparged into the reactor, the refined wax is charged to the reactor and then heated to about 130° C. to about 150° C., more preferably from about 142° C. to about 147° C. Air or oxygen containing gases are then admitted to the reactor at a rate of from about 0.8 to about 1.2 sl/m/kg wax. The pressure in the reactor is preferably controlled at 80-100 psig via a control valve on the exit side. After an initial induction period the oxidation starts with generation of heat. The reactor is cooled by means of an internal cooling coil or an external jacket. During reaction, the reactor is maintained at a temperature higher than the melting point of the wax feedstock, preferably from about 130° C. to about 160° C., more preferably at about 140° C. to about 150° C., and most preferably at about 145° C. Samples are withdrawn hourly and the acid number is determined. When the desired acid number has been reached, the gas flow is stopped and the reactor is vented to atmospheric pressure. The oxidized wax is then discharged and suitably finished. The oxidized byproduct wax prepared in this manner has excellent color, is hard, has a high melting point and has the preferred acid numbers and low viscosity described herein. Alternate conditions may increase the viscosity beyond and above the feedstock viscosity.

The oxidized, low viscosity waxes of the invention that are produced as a byproduct from such a process are distinguished by the above properties from other waxes which are produced through different methods. Particularly, not all polyethylene waxes are equivalent, as illustrated in Table 1 below. Table 1 provides nuclear magnetic resonance (NMR) data comparing the properties of an oxidized, low viscosity homopolymer byproduct wax of the invention, designated in the table as "oxidized CS-600" wax, with an oxidized, low density polyethylene wax designated in Table 1 as "A-C® 629" wax. NMR data is also provided for non-oxidized A-C® 629 wax as well as non-oxidized CS-600 wax. CS-600 is a low viscosity, byproduct wax composition produced by the polymerization of polyethylene with a Ziegler-type catalyst via the Ziegler slurry polymerization process. The CS-600 wax is commercially available from Honeywell International Inc. of Morristown, N.J. As preferred herein, oxidized CS-600 wax is a substantially linear polymer having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5.

TABLE 1

| Branch Distribution (branches/1,000 C) | Non-Oxidized CS-600 | Oxidized CS-600 | Oxidized A-C ® 629 | Non-Oxidized A-C ® 629 |
|---|---|---|---|---|
| Pendant-$CH_3$ | 1.5 | 1.4 | 0.8 | 1.1 |
| Ethyl on Quaternary | 0.0 | 0.5 | 5.6 | 5.7 |
| 1,3-Diethyl | 0.4 | 0.7 | 4.9 | 6.2 |
| Regular Ethyl | 1.7 | 1.5 | 2.9 | 3.0 |
| Butyl | 0.4 | 0.3 | 9.5 | 10.5 |
| Pentyl | 0.2 | 0.2 | 2.9 | 3.2 |
| Hexyl and Longer | 44.8 | 41.5 | 8.6 | 9.2 |
| Terminal OH | 0.0 | 0.2 | 2.4 | 2.5 |
| Secondary Alcohol | 0.2 | 1.6 | 3.3 | 0.0 |
| Primary Alcohol | 0.0 | 0.0 | 0.1 | 0.0 |
| Ketone | 0.8 | 7.9 | 5.8 | 0.0 |
| Methyl Ketone or Aldehyde | 0.0 | 2.3 | 2.5 | 0.0 |
| Chain-End Acid | 0.0 | 3.1 | 3.3 | 0.0 |
| Lactone | 0.0 | 0.9 | 1.0 | 0.0 |

TABLE 1-continued

| Branch Distribution (branches/1,000 C) | Non-Oxidized CS-600 | Oxidized CS-600 | Oxidized A-C® 629 | Non-Oxidized A-C® 629 |
|---|---|---|---|---|
| C=O/OH | 4.00 | 8.00 | 2.13 | 0.00 |
| Aliphatic branches | 48.9 | 46.1 | 35.2 | 38.9 |
| Total branches | 49.9 | 62.0 | 53.7 | 41.4 |

Table 1 above presents a summary of C-13 NMR results for non-oxidized CS-600 feedstock wax, oxidized CS-600 wax, oxidized A-C® 629 wax and non-oxidized A-C® 629 wax (A-C® 6 feedstock wax). The NMR data illustrates that oxidized CS-600 and oxidized A-C® 629 (and their respective non-oxidized feedstocks) are different in their branching distributions and terminal groups. Particularly, the branching in oxidized CS-600 and non-oxidized CS-600 is predominately long chain branching ($C_6$ or longer). The branching in oxidized A-C® 629 and its non-oxidized feedstock have more short chain branching ($C_5$ or shorter) than long chain branching. A-C® 629 and its feedstock are terminated with OH groups; oxidized CS-600 and non-oxidized CS-600 are terminated with $CH_3$ groups. Oxidized CS-600 has a higher C=O/OH ratio than A-C® 629. As shown from the above, the oxidized, low viscosity CS-600 wax is substantially different than a standard oxidized A-C® 629 polyethylene wax, allowing the significant benefits of the invention to be achieved.

As stated above, the oxidized, low viscosity byproduct wax component has a viscosity of less than about 100 cps at 140° C., more preferably a viscosity of less than about 75 cps at 140° C., and most preferably less than about 50 cps at 140° C. The overall lubricant composition has a viscosity of less than about 450 cps at 140° C., more preferably less than about 375 cps and most preferably less than about 300 cps at 140° C., wherein the lubricant composition includes at least about 30% by weight of the composition of a metal salt at such viscosities.

The processes of the present invention involve multi-step procedures in which the fatty acid metal salt is preferably generated in-situ in a wax melt. The lubricant is preferably prepared by first forming a wax melt that comprises at least one oxidized, low viscosity wax in a suitable vessel. A suitable vessel is one that is capable of heating and maintaining the wax components of the lubricant composition at or above its melting temperature. For the purposes of this invention, "wax melt" as used herein describes a combination of one or more waxes heated to a temperature above the melting points of the component waxes, and having no fatty acid metal salt blended therein. The phrase "lubricant composition" as used herein is directed to a combination of one or more waxes which have been combined with at least one fatty acid metal salt, and/or at least one metal oxide/hydroxide and fatty acid when forming the metal salt in-situ, and optionally one or more fatty alcohols or fatty acid esters.

In the preferred embodiment of the invention, the wax melt also comprises at least one hydrocarbon wax. For the purposes of the invention, hydrocarbon waxes include (non-oxidized) polyethylene waxes, microcrystalline waxes, paraffin waxes, alpha-olefin waxes and Fischer-Tropsch waxes. The wax melt is formed by heating said wax components to a temperature of from about 100° C. to about 150° C., more preferably from about 120° C. to about 140° C., and preferably with some agitation.

Including said optional hydrocarbon wax, the oxidized, low viscosity wax component preferably comprises from about 10% to about 35% by weight of said lubricant composition, more preferably from about 15% to about 25% by weight and most preferably comprises about 20% by weight of said lubricant composition. If present, the hydrocarbon wax preferably comprises from about 5% to about 25% by weight of said lubricant composition, more preferably from about 10% to about 20% by weight and most preferably comprises about 15% by weight of said lubricant composition.

Either prior to, during or after formation of the wax melt, the next step in forming the lubricant composition of the invention is the formation of the fatty acid metal salt. The fatty acid metal salt may be formed in-situ or prior to addition to the wax melt. In the preferred embodiment of the invention, a fatty acid metal salt is formed in-situ with the wax or waxes of the lubricant composition. It is well known in the art that fatty acid metal salts, such as calcium stearate, may be formed by the reaction of a fatty acid with a metal oxide or a metal hydroxide. In an in-situ process, a fatty acid is added to the vessel and combined with the oxidized, low viscosity wax and optional hydrocarbon wax. Suitable fatty acids non-exclusively include stearic acid, palmitic acid, lauric acid, behenic acid, montanic acid and combinations thereof. Such acids are commercially available. Generally, any alkyl acid having from 10 to 30 carbon atoms in the molecular chain is suitable for use herein.

Thereafter, a metal oxide or metal hydroxide is added to the vessel and reacted with the fatty acid. Suitable metal oxides or metal hydroxides include oxides and hydroxides of Group II metals such as calcium, magnesium, barium, zinc, cadmium and lead. The reaction of the metal oxide or metal hydroxide with the fatty acid results in a reaction product of a fatty acid metal salt. The metal salt that is formed will depend on the particular selection of fatty acid and metal oxide or metal hydroxide. In the preferred embodiment of the invention, the fatty acid comprises stearic acid and the preferred metal oxide or metal hydroxide comprises a calcium oxide or calcium hydroxide. Accordingly, the preferred fatty acid metal salt comprises calcium stearate. Also suitable are combinations of fatty acid salt anions such as barium/calcium stearate, calcium/zinc stearate, barium/cadmium stearate and the like.

Coincidentally, in addition to reacting with the fatty acid, the metal oxide or metal hydroxide component may also react with any acid groups present from oxidized wax, and other functional groups in the oxidized wax may thereby be saponified. These include primarily esters and acid anhydrides, and to a smaller degree, peroxides, ketones and aldehydes. These functional groups are generated via the oxidation of the byproduct wax and make the wax polar. It has been found that when the metal oxide/hydroxide comprises calcium oxide or calcium hydroxide, this additional reaction further improves the lubricating properties of the lubricant composition. This properties and performance of the wax is tied to the type of feedstock used and the oxidized wax.

Forming the fatty acid metal salt in-situ, the metal oxide or metal hydroxide is preferably added to comprise from about 1% to about 10% by weight of said lubricant composition, more preferably from about 3% to about 8% and most preferably about 5% by weight of said lubricant composition. The fatty acid is preferably added at a quantity to comprise from about 30% to about 70% by weight of said lubricant composition, more preferably from about 40% to about 60% and most preferably from about 45% to about 55% by weight of said lubricant composition. In the preferred embodiment of the invention, the fatty acid metal salt preferably comprises at least about 30% by weight of said lubricant composition, more preferably at least about 50% by weight, more preferably at least about 60% by weight of said lubricant composition. More particularly, the fatty acid metal salt preferably comprises from about 30% to about 70% by weight of said lubricant composition, more preferably from about 45% to about 70% and most preferably from about 60% to about 70% by weight of said lubricant composition.

The reaction of the metal oxide or metal hydroxide with the fatty acid also results in the production of water as a byproduct. The water will be evaporated by vessel temperatures above 100° C. In the wax melt, the water will turn to steam producing a foam. In order for this foam to boil off in a controlled manner, it is preferred that the metal oxide or metal hydroxide be gradually added to the vessel. To assist in dissipating the foam, it is preferred to add a fatty alcohol or fatty acid ester into the vessel to combine with the other lubricant components. Suitable fatty alcohols non-exclusively include, for example, stearyl alcohol, lauryl alcohol or combinations thereof. Suitable fatty acid esters non-exclusively include glycerol fatty acid esters, such as glycerol monostearate. Most preferably, the optional fatty alcohol/fatty acid ester comprises glycerol monostearate. Such fatty alcohols/fatty acid esters also have an internal lubricating effect which enhances the metal stearate effects. If added, the fatty alcohol/fatty acid ester is preferably added to comprise a quantity of about 5% to about 15% by weight of said lubricant composition, more preferably from about 7.5% to about 12.5% by weight and most preferably from about 9% to about 10% by weight of said lubricant composition. The lubricant composition of the invention may also include additives, such as pigments or stabilizers, as is well known in the art, as described in U.S. Pat. No. 4,544,694, the full disclosure of which is incorporated herein by reference.

In a preferred method for forming the metal salt in-situ in said lubricant composition of the invention, a wax melt is first formed by adding the oxidized, low viscosity wax and optional hydrocarbon wax to a suitable vessel and heating it to approximately 140° C., preferably with slight agitation. The melt is held at this temperature and the fatty acid is added, preferably with slight agitation to prevent any of the acid from settling at the bottom of the vessel. Next, a portion of the metal oxide or metal hydroxide is added with slight agitation. This causes a reaction of the metal oxide/hydroxide with the fatty acid, also generating a water byproduct. Since the melt is being held at a temperature above the boiling point of water, the water byproduct turns to steam and produces foam in the melt. As the reaction of the fatty acid and the metal oxide/hydroxide proceeds, the fatty alcohol/fatty acid ester may then be added to help dissipate the foam. As the reaction takes place, the melt is preferably stirred slowly to release any entrapped air. This procedure continues until all of the metal oxide/hydroxide has been added and water formation stops and a homogeneous a mixture is formed. Finally, the melt may be cooled and held for a finishing step such as prilling or pastillating as is well known in the art. It should be understood that while this is a preferred method, the sequence of steps may be varied. For example, it is possible to add all of the metal oxide/hydroxide at once if using a reactor with a lot of head space to handle the foam formation prior to adding the fatty alcohol/fatty acid ester. In an alternate method, the metal salt may be prepared independently and be subsequently added to a desired wax melt composition in a desired amount.

The resulting compositions of matter have been found to be excellent internal or external extrusion lubrication compositions for the extrusion of thermoplastics, particularly vinyl polymers such as polyvinyl chloride, chlorinated polyvinyl chloride, polyvinylidene chloride and copolymers thereof. See, for example, U.S. Pat. No. 5,426,144, the disclosure of which is incorporated herein by reference, which teaches alternate extrusion lubricant compositions. See also, for example, U.S. Pat. No. 4,030,328 which teaches a process for the continuous lubrication of the working surfaces of an extrusion die. In addition to their use as extrusion aids, the lubricant compositions of this invention may also be used as nucleating agents, metal powder lubricants, mold release agents, heat stabilizers and like applications where materials such as relatively pure calcium stearate are currently being used. As a lubricant, an effective amount for lubricating the vinyl polymer is used. Typically, the lubricant is present in an amount of about 0.01 to about 10 parts by weight per 100 parts of vinyl polymer. Preferably, the lubricant is present in an amount of about 0.05 to about 5 parts by weight per 100 parts of vinyl polymer, more preferably in an amount of about 0.05 to about 1 part by weight per 100 parts of vinyl polymer, and most preferably in an amount of about 0.1 to about 1 part by weight per 100 parts of vinyl polymer.

The invention is more specifically described with reference to the examples below wherein all parts and percentages are by weight unless otherwise specified. The examples serve to illustrate the invention and the present invention should not be construed to be limited thereto.

EXAMPLE 1

A lubricant composition was formed by first adding 40.00 gms of oxidized CS-600 low viscosity byproduct wax (viscosity: 11 cps; acid number: 14.7 mg KOH/gram; Mettler drop point: 109.5° C.), 29.46 gms of hydrocarbon wax and 98.30 gms of stearic acid to a reactor vessel. The combination was melted and held at 140° C. with slight agitation. Approximately 6.00 gms of calcium hydroxide was then added with agitation. The calcium hydroxide reacted with the stearic acid, forming a calcium stearate product and water as a byproduct. The high temperatures converted the water to steam, generating foam. Approximately 20.24 gms of glycerol monostearate was then added to dissipate the foam. Next, another 6.00 gms of calcium hydroxide was added to the vessel with agitation. The mixture was mixed until water formation stopped, and it was slowly stirred to remove any entrapped air. The mixture was then held for a finishing step such as prilling or pastiliating. The resulting lubricant composition contained 20.65% of an oxidized, low viscosity byproduct wax, 15.21% of a hydrocarbon wax, 6.91% residual stearic acid, 10.45% residual glycerol monostearate, and 46.77% calcium stearate. At 140° C., this lubricant composition had a viscosity of 300 centipoise and an acid number of 15.1 mg KOH/gram.

EXAMPLE 2

Comparative

Example 1 was repeated, except only 50% of the low viscosity byproduct wax used was oxidized, and 50% of the byproduct wax was non-oxidized. At 140° C., this lubricant composition had a viscosity of 420 centipoise and an acid number of 13.7 mg KOH/gram.

EXAMPLE 3

Comparative

Example 1 was repeated, except the low viscosity byproduct wax used was not oxidized at all. At 140° C., this lubricant composition had a viscosity of 465 centipoise and an acid number of 15.3 mg KOH/gram.

EXAMPLE 4

Example 1 was repeated to obtain a lubricant having an acid number of 21 mg KOH/gram. At this acid number, the lubricant had a viscosity of 121 cps at 140° C.

EXAMPLE 5

Comparative

Example 1 was repeated, only using A-C® 629 oxidized polyethylene homopolymer wax (acid number: 16.8 mg KOH/gram; viscosity: 210 cps @140° C.) instead of the oxidized, low viscosity byproduct wax of Example 1. This lubricant composition had an acid number of 21 mg KOH/gram and a viscosity of 415 centipoise at 140° C.

EXAMPLE 6

A lubricant composition was formed by first adding 43.00 gms of oxidized CS-600 low viscosity byproduct wax (viscosity: 11 cps; acid number: 14.7 mg KOH/gram; Mettler drop point: 109.5° C.), 122.50 gms of stearic acid, 15.5 gms of calcium hydroxide and 19.0 gms of glycerol monostearate to a reactor vessel. The combination was melted and held at 140° C. with slight agitation. The calcium hydroxide reacted with the stearic acid, forming a calcium stearate product and water as a byproduct. The high temperatures converted the water to steam, generating foam, and the foam was dissipated by the glycerol monostearate. The mixture was mixed until water formation stopped, and it was slowly stirred to remove any entrapped air. The mixture was then held for a finishing step such as prilling or pastillating. The resulting lubricant composition contained 22.42% of the oxidized byproduct wax, 6.68% residual stearic acid, 9.90% residual glycerol monostearate, and 61.00% calcium stearate. This lubricant composition had an acid number of 23.2 mg KOH/gram and a viscosity of 1900 centipoise at 140° C.

EXAMPLE 7

Comparative

Example 6 was repeated exactly, only using A-C® 629 oxidized polyethylene homopolymer wax instead of the oxidized, low viscosity byproduct wax. This lubricant composition had an acid number of 23 mg KOH/gram and a viscosity of 7800 centipoise at 140° C.

EXAMPLE 8

CS-600 byproduct wax is oxidized at about 145° C. at an oxidation rate of about 2.0-2.7 acid units/hour, to achieve an acid number of about 7 to about 24 mg KOH/gram. The oxidized byproduct wax is incorporated into a lubricant composition formed in accordance with Example 1 or Example 5.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A lubricant composition comprising:
   a) an oxidized, low viscosity polyethylene wax having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5; and said wax comprising a substantially linear polymer; and
   b) at least one metal salt, which metal salt comprises a reaction product of the reaction of a metal oxide or a metal hydroxide with a fatty acid, and which metal salt comprises at least about 30% by weight of the lubricant composition; and
   wherein said lubricant composition is water-free has a viscosity of less than about 450 cps at 140° C.

2. The lubricant composition of claim 1 wherein said oxidized, low viscosity polyethylene wax comprises a byproduct composition produced by the polymerization of ethylene with a Ziegler-type catalyst and subsequently oxidized.

3. The lubricant composition of claim 1 further comprising at least one hydrocarbon wax, said hydrocarbon wax comprising a polyethylene wax, a microcrystalline wax, a paraffin wax, an alpha-olefin wax, a Fischer-Tropsch wax or a combination thereof.

4. The lubricant composition of claim 1 wherein said fatty acid comprises stearic acid, palmitic acid, lauric acid, behenic acid, montanic acid or a combination thereof.

5. The lubricant composition of claim 1 wherein said metal oxide or metal hydroxide comprises calcium oxide, calcium hydroxide, magnesium oxide, magnesium hydroxide, barium oxide, barium hydroxide, zinc oxide, zinc hydroxide, cadmium oxide, cadmium hydroxide, lead oxide or lead hydroxide.

6. The lubricant composition of claim 1 wherein said metal salt comprises calcium stearate.

7. The lubricant composition of claim 1 further comprising at least one fatty alcohol or fatty acid ester.

8. The lubricant composition of claim 1 wherein said metal salt comprises at least about 70% by weight of the lubricant composition.

9. The lubricant composition of claim 1 wherein said lubricant composition has a viscosity of less than about 375 cps at 140° C.

10. The lubricant composition of claim 1 wherein said oxidized, low viscosity polyethylene wax has a viscosity of less than about 75 cps at 140° C.

11. A polymer composition comprising a vinyl polymer and the lubricant composition of claim 1.

12. A process for forming a water-free lubricant composition comprising:
   a) providing a wax melt comprising at least one oxidized, low viscosity polyethylene wax, said oxidized, low viscosity polyethylene wax having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5; and said low viscosity polyethylene wax comprising a substantially linear polymer; and thereafter performing either b) or c);
   b) blending at least one metal salt into said wax melt, which metal salt comprises a reaction product of the reaction of a metal oxide or a metal hydroxide with a fatty acid, and which metal salt comprises at least about 30% by weight of the lubricant composition; or c) reacting a fatty acid with either a metal oxide or a metal hydroxide in said wax melt, under conditions sufficient to form a metal salt reaction product, and removing any water generated by said reacting by evaporation.

13. The process of claim 12 wherein b) is conducted.

14. The process of claim 12 wherein c) is conducted.

15. The process of claim 12 wherein said oxidized, low viscosity polyethylene wax comprises a byproduct composition produced by the polymerization of polyethylene with a Ziegler-type catalyst and subsequently oxidized.

16. The process of claim 12 wherein said oxidized, low viscosity polyethylene wax is oxidized at an oxidation rate of from about 2.0 to about 2.7 acid units/hour to an acid number of from about 7 to about 24 mg KOH/gram.

17. The process of claim 12 further comprising blending at least one hydrocarbon wax into said wax melt, said hydrocarbon wax comprising a polyethylene wax, a microcrystalline wax, a paraffin wax, an alpha-olefin wax, a Fischer-Tropsch wax or a combination thereof.

18. The process of claim 12 further comprising adding a fatty alcohol or fatty acid ester to said wax melt.

19. The process of claim 12 wherein said fatty acid comprises stearic acid, palmitic acid, lauric acid, behenic acid, montanic acid or a combination thereof.

20. The process of claim 12 wherein said metal oxide or metal hydroxide comprises calcium oxide, calcium hydroxide, magnesium oxide, magnesium hydroxide, barium oxide, barium hydroxide, zinc oxide, zinc hydroxide, cadmium oxide, cadmium hydroxide, lead oxide or lead hydroxide.

21. The process of claim 12 wherein said metal salt comprises calcium stearate.

22. A lubricant composition comprising:

a) from about 10% to about 35% by weight of the composition of at least one oxidized, low viscosity polyethylene wax, having a melt viscosity of less than or equal to about 100 centipoise at 140° C., an acid number of from about 7 to about 24 mg KOH/gram, a weight average molecular weight of less than about 1500, a number average molecular weight of less than about 800, and a polydispersity index of at least about 3.5; said low viscosity polyethylene wax comprising a substantially linear polymer; and wherein said oxidized, low viscosity polyethylene wax comprises a byproduct composition produced by the polymerization of polyethylene with a Ziegler-type catalyst;

b) from about 5% to about 20% by weight of at least one hydrocarbon wax;

c) from about 1% to about 10% by weight of at least one fatty acid;

d) from about 5% to about 15% by weight of a fatty alcohol or fatty acid ester; and e) at least one metal salt, which metal salt comprises a product of the reaction of a metal oxide or a metal hydroxide with said fatty acid, and which metal salt comprises at least about 30% by weight of the lubricant composition; and wherein said lubricant composition is water-free and has a viscosity of less than about 450 cps at 140° C.

* * * * *